Patented Nov. 14, 1939

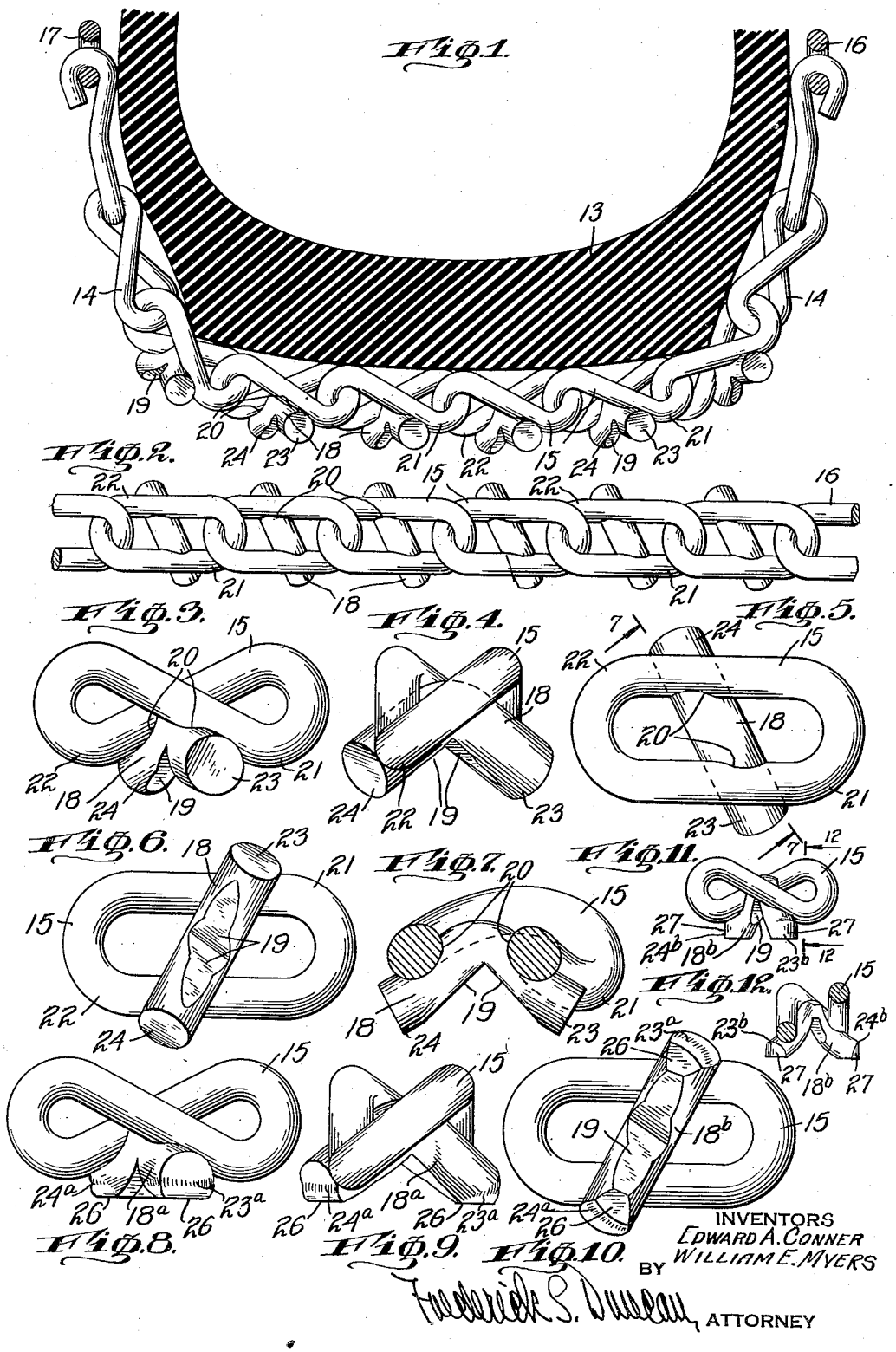

2,180,101

UNITED STATES PATENT OFFICE 2,180,101

REINFORCED ANTISKID TIRE CHAIN

Edward A. Conner, Stratford, Conn., and William E. Myers, York, Pa., assignors to American Chain & Cable Company, Inc., New York, N. Y., a corporation of New York Application June 3, 1938, Serial No. 211,510

14 Claims. (Cl. 152—243)

This invention relates to improvements in reinforced anti-skid tire chains.

The main object of this invention is the provision of an improved reinforced link construction for such chains which will have increased tractive and braking efficiency and greater resistance against skidding and sliding and other advantages as hereinafter brought out more fully.

A more specific object of this invention is to provide a tread link with a diagonally extending reinforcing traction and anti-skid device connected to the side strands of a curb link adjacent to its ground engaging lobes and which is made of relatively heavy stock providing sturdy spaced traction caulks, anti-skid lugs or reinforcements, said device consisting preferably of a bar connected to the side strands in such a manner as to partially surround the side strands providing for a secure anchorage of the bar to the side strands and operating to prevent spreading of the ground engaging lobes of the link.

Another object of the invention consists in employing a bar of such transverse cross section and lengthwise contour as to provide widely spaced projections which remain spaced as long as the link is in service.

Other objects of the invention consist in using a bar of round stock with the material that would normally be worn away first, displaced into the projections or caulks to provide for longer wear, and/or with the material which would normally be subjected to wear during the last stage of the use of the link also displaced into the projections or caulks to increase the amount of material therein at the point of contact with the road.

Still another object of this invention is the provision of a V-shaped reinforcing bar, the free ends of the legs of which extend below the plane of the lowermost portions of the ground engaging lobes of the link and laterally outwardly beyond the sides of the link so that the first wear will be on the reinforcing bar and the area of the contact faces of the bar subjected to wear will be increased during service, and so that the effective width of the link will be increased as the link is rotated under traction and braking effect to cause a greater amount of the load to be placed on the link and the road engaging end of the reinforcing bar.

Other objects of the invention will appear from the following description taken in connection with the drawing in which:

Fig. 1 is a view showing our improved reinforced anti-skid link incorporated in a transversely extending tread chain mounted on a tire;

Fig. 2 is a top plan view of a section of the reinforced chain;

Fig. 3 is a side view of a reinforced link;

Fig. 4 is an end view of the link;

Fig. 5 is a top plan view of the link;

Fig. 6 is a bottom plan view of the link;

Fig. 7 is a section taken on the line 7—7 of Fig. 5;

Fig. 8 is a side view of a link provided with a modified form of reinforcement;

Fig. 9 is an end view of the link shown in Fig. 8;

Fig. 10 is a bottom plan view of the link shown in Fig. 8;

Fig. 11 is a side view of a link showing another modified form of reinforcement; and Fig. 12 is a cross sectional view of the link shown in Fig. 11, taken on the line 12—12 of Fig. 11.

Referring first to Figs. 1 to 7, Fig. 1 shows a tire 13 upon which is mounted a cross chain 14 including our reinforced tread links 15, there being a series of tread chains 14 connected to side chains 16 and 17 in the conventional manner. This figure shows the position of the reinforcements when the tire is at rest or under small traction and braking forces. The reinforcement preferably consists of a V-shaped bar 18 which is preferably of heavier stock than that of the link to which it is secured and we have shown this applied to a curb link of conventional construction. The bar 18 before it is applied is formed from a straight bar by means of dies (not disclosed) which flatten the inner sides of portions of the legs of the V as indicated at 19 and which form recesses such as 20 in the outer sides of the legs of the V conforming to the shape and direction of the side strands of the link at the points at which the reinforcement is secured.

We prefer to secure the end portions of the reinforcements to the side strands of the link adjacent to the ground engaging lobe portions 21 and 22 of the link in substantially the position indicated in the various figures providing outwardly diverging traction caulks, anti-skid lugs or reinforcements 23 and 24 diverging with respect to a vertical plane diagonal of the link. The construction is such that the caulks 23 and 24 preferably project downwardly beyond the plane of the lowermost portions of the lobes 21 and 22 and laterally beyond the side strands of the link. The caulks 23 and 24 protect the lobes 21 and 22 by taking most of the wear until they have been worn away into the plane of the lowermost portions of the lobes 21 and 22, and thereafter share the wear and protect the lobes 21 and 22 against rapid wear as is well understood. The construction disclosed provides spaced caulks 23 and 24 which because of the flattened inner sides 19 and the location of the apex of the V will remain spaced as long as the link may be used. As disclosed in Fig. 7, the outer surface of the apex of the V is substantially in line with the upper faces of the side strands at the point of connection. Similarly the caulks 23 and 24 will operate as separate and distinct elements with respect to the lobes 21 and 22 until the lobes have been worn to such extent as to weaken the chain to prevent further use of the chain. Even then the worn caulks will be quite effective especially upon rotation of the link under traction and braking effort.

The bar 18 is welded as shown in Fig. 7 along semi-cylindrical interengaging surfaces of the bar and side strands in the lines of thrust from the caulks 23 and 24, and connects and spaces the strands to prevent spreading and crushing of the link. As the caulks extend beyond the sides of the link one of them operates during rotation of the link to depress the tire and cause a transfer of a larger proportionate part of the load to the other caulk which is in contact with the road.

The reinforcement disclosed in these figures provides for effective traction and braking and functions effectively to prevent sliding in the direction of travel and also sidewise skidding, without causing objectionable vibrations. It also prevents rapid wear of the lobes or connecting loops of the links.

The reinforcing bar 18a disclosed in Figs. 8, 9, and 10 is similar to that disclosed in Figs. 1 to 7 except that the material which in the construction shown in Figs. 1 to 7 is worn off first, is displaced into the ends 23a and 24a by flattening as indicated at 26. This reduces the intensity of the vibrations set up by the chain without a reduction in the amount of material in the road engaging ends of the reinforcement.

In the modification disclosed in Figs. 11 and 12 the portion of the stock which corresponds to the upper edges of the ends of the reinforcement is displaced into the ends 23b and 24b of the reinforcing bar 18b as indicated at 27 in these figures. This provides more material in the road engaging ends of the reinforcement without increasing the intensity of the vibrations set up by the chain.

By locating the ends of the reinforcing bar adjacent to the ground engaging lobes rather than at the lowermost portions of these lobes and by recessing the outer side faces of the legs of the bar, we may use a reinforcing bar of relatively heavy stock without unduly increasing the total height of the link and without causing excessive vibrations.

The reinforcing bar not only takes the wear off the ground engaging lobes initially but also provides additional material to receive wear when the reinforcement has been worn down into the plane of the lowermost portions of the lobes. The bar connects the ground engaging lobes together and reinforces and stiffens the link. When the reinforcing bar of the first form is worn down somewhat the road engaging face of the reinforcement is enlarged. At all times the upper corner of the caulk will dig into the road when the link is rotated under traction or under braking effort so that the caulk will be effective even after it has been worn down considerably.

The road engaging ends of the reinforcement shown in Figs. 8, 9 and 10 are originally shortened but the material is preferably displaced into the ends providing a wider caulk than in the first modification.

In the third modification the pieces of stock may be of the same length as those of the other forms or slightly longer if desired. In this construction the apex of the V is blunt and is narrower than the space between the side strands of the link, the reinforcement when formed having been extended and the material having been flowed outwardly into the road engaging ends of the reinforcement and there restrained by suitable dies to provide lateral faces on these caulks which are substantially vertical thereby providing road engaging faces which are of somewhat circular form and of substantial area. It is apparent there is considerably more material in the road engaging ends of the reinforcements in the modification shown in Figs. 11 and 12 for the same increase of overall height of the link and reinforcement than in the other modifications disclosed.

We may employ relatively small curb links as the ground engaging lobes are protected against excess wear by the relatively thick reinforcements with the advantage that our improved reinforced links cause substantially no greater vibrations than the conventional size curb links now used in anti-skid chains.

We have illustrated and described several embodiments of our invention for purposes of disclosure. It is to be understood that we reserve the right to use such other forms as fall within the principles of our invention and the scope of the appended claims.

We claim:

1. In an anti-skid chain, a curb tread link comprising oppositely inclined side strands and end loops defining a pair of tire engaging lobes and a pair of ground engaging lobes, and a reinforcing bar on the bottom side of the link and extending diagonally of said link and welded to said side strands at points adjacent to said ground engaging lobes and having its ends diverging and extending downwardly below the plane of the lowermost portions of said ground engaging lobes of the link and laterally beyond the sides of the link.

2. In an anti-skid chain comprising a curb link including oppositely inclined side strands and end loops defining a pair of tire engaging lobes and a pair of ground engaging lobes, and a reinforcing bar on the bottom side of the link and extending diagonally of said link and welded to said side strands at points adjacent to said ground engaging lobes, the ends of said bar extending downwardly below the plane of the lowermost portions of said ground engaging lobes and laterally beyond the sides of the link.

3. In an anti-skid chain, a curb link comprising oppositely inclined side strands and end loops defining tire engaging lobes and ground engaging lobes, and a V-shaped reinforcing bar of heavier stock than that of the link located within said link and extending diagonally of the link and having its legs welded to said side strands at points adjacent to the ground engaging lobes, the welded zones at said points surrounding the side strands to a substantial extent and located within the contour of said bar.

4. In an anti-skid chain, a curb link comprising oppositely inclined side strands and end loops defining tire engaging lobes and ground engaging lobes, and a V-shaped reinforcing bar of heavier stock than the stock of said link located within said link and extending diagonally of the link and having its legs welded to the side strands at points adjacent to the ground engaging lobes, the welded zones at said points surrounding the side strands to a substantial extent and located within the contour of the legs of the reinforcing bar, said legs diverging and extending downwardly beyond the plane of the lowermost portions of the ground engaging lobes and laterally beyond the sides of the link.

5. In an anti-skid chain, a curb link comprising oppositely inclined side strands and tire engaging and ground engaging lobes, and a V-shaped bar of round cross section located within and extending diagonally of the link and having its legs welded to the side strands at points adjacent said ground engaging lobes and extending downwardly below the plane of the lowermost portions of said ground engaging lobes and laterally beyond the sides of the link, the inner side faces of said legs being flattened to increase the distance between the legs whereby the ends of the legs as they are worn down during service will continue to function as spaced anti-skid projections.

6. In an anti-skid tire chain, a curb link comprising oppositely inclined side strands, tire engaging lobes and ground engaging lobes, and a V-shaped reinforcing bar located within said link and welded to said side strands at points adjacent said ground engaging lobes in zones of the same radius and extending in the same direction, as the portions of said side strands at said points.

7. In an anti-skid tire chain, a curb link provided with ground engaging lobes and oppositely inclined side strands, and a V-shaped reinforcing bar of round stock located within said link and extending diagonally thereof and having its legs welded to the side strands adjacent to the ground engaging lobes of the link, and inner faces of the legs of the bar being flattened to decrease the weight of the bar and to maintain the wear receiving ends of the legs of the bar separate during wear, the downwardly extending edges of said bar being flattened to provide road engaging faces, the ends of said legs extending downwardly below the plane of the lowermost portions of said ground engaging lobes and laterally beyond the sides of the link and said road engaging faces being located substantially vertically below said side strands.

8. In an anti-skid chain, a curb link including oppositely inclined side strands and ground engaging lobes, and a V-shaped bar welded to said side strands and having its apex extending between the side strands and the ends of the legs projecting downwardly beyond the plane of the lowermost portions of the ground engaging lobes of the link and laterally beyond the sides of the link, said bar being of round stock with the inner faces of portions of the legs of the V flattened and said portions of the legs of decreased cross sectional areas, the lowermost edges of the projecting ends of said legs being flattened and the outermost edges of the projecting ends of said legs being rounded and the projecting ends of said legs being of increased cross sectional areas.

9. In an anti-skid chain, a curb link comprising oppositely inclined side strands and angularly related end loops defining ground engaging lobes, and a V-shaped reinforcing bar having the outer sides of its legs recessed to conform to the cross-sectional shape and the direction of the side strands and welded about said side strands and the inner sides of its legs flattened to space said legs, whereby a V-bar of relatively heavy stock may be used without unduly raising the overall height of the link for a wide spacing of the road engaging ends of the legs of the V-bar.

10. In an anti-skid chain, a curb link comprising oppositely inclined side strands and angularly related end loops defining ground engaging lobes, and a V-bar formed of bar stock of a diameter substantially equal to the distance between the side strands, the outer sides of the legs of the V having recesses, said legs being welded to said side strands along the surfaces of said recesses, the ends of said legs diverging and extending downwardly beyond the plane of the lowermost portions of said ground engaging lobes.

11. In an anti-skid chain, a curb link comprising oppositely inclined side strands and ground engaging lobes, of downwardly diverging reinforcements of heavier stock than that of the link recessed to receive the side strands and welded to the inside opposed and road sides of said side strands at points adjacent to said ground engaging lobes.

12. In an anti-skid chain, a curb link comprising oppositely inclined side strands and ground engaging lobes, of reinforcements of heavier stock than that of the link recessed to receive the side strands and welded to the inside opposed and road sides of said side strands at points adjacent to said ground engaging lobes, and an integral connection between the upper ends of said reinforcements.

13. In an anti-skid chain, a curb link comprising oppositely inclined side strands and ground engaging lobes, of downwardly diverging reinforcements of heavier stock than that of the link recessed to receive the side strands and welded to the inside opposed and road sides of said side strands.

14. In an anti-skid chain, a curb link comprising oppositely inclined side strands and ground engaging lobes, of reinforcements of heavier stock than that of the link recessed to receive the side strands and welded to the inside opposed and road sides of said side strands, and an integral connection between the upper ends of said reinforcements.

EDWARD A. CONNER.
WILLIAM E. MYERS.